(12) United States Patent
Akita (10) Patent No.: US 10,718,281 B2
(45) Date of Patent: Jul. 21, 2020

(54) EVAPORATIVE FUEL TREATMENT APPARATUS AND CONTROL METHOD FOR EVAPORATIVE FUEL TREATMENT APPARATUS

(71) Applicant: TOYOTA JIDOSHA KABUSHIKI KAISHA, Toyota-shi (JP)

(72) Inventor: Tatsuhiko Akita, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/423,837

(22) Filed: May 28, 2019

(65) Prior Publication Data

US 2019/0368432 A1 Dec. 5, 2019

(30) Foreign Application Priority Data

May 30, 2018 (JP) .................................. 2018-103803

(51) Int. Cl.
*F02D 41/00* (2006.01)
*B60K 15/035* (2006.01)
*F02M 25/08* (2006.01)

(52) U.S. Cl.
CPC ...... *F02D 41/003* (2013.01); *B60K 15/03504* (2013.01); *F02M 25/0809* (2013.01)

(58) Field of Classification Search
CPC ........... F02M 25/0854; F02M 25/0836; F02M 25/089; F02M 25/0872; F02M 35/10222; F02M 25/08; F02M 25/0809; F02M 35/0218; B60K 2015/03514; B60K 15/03504; F02D 41/003; F02D 41/004; F02D 41/2464; F02D 41/222
See application file for complete search history.

(56) References Cited

U.S. PATENT DOCUMENTS

| 6,523,398 B1* | 2/2003 | Hanai ................ F02M 25/0809 73/114.39 |
| 6,631,635 B2* | 10/2003 | Hanazaki ........... F02M 25/0809 73/114.38 |
| 2014/0102420 A1* | 4/2014 | Kimoto .............. F02M 25/0836 123/520 |

(Continued)

FOREIGN PATENT DOCUMENTS

| JP | 2014-77422 | 5/2014 |
| JP | 2016-79851 | 5/2016 |

*Primary Examiner* — Sizo B Vilakazi
(74) *Attorney, Agent, or Firm* — Oblon, McClelland, Maier & Neustadt, L.L.P.

(57) ABSTRACT

An evaporative fuel treatment apparatus includes a canister, a vapor passage, an outside air introduction passage, a purge passage that connects the canister and an intake passage to each other, a sealing valve configured to open/close a flow channel of the vapor passage, a tank internal pressure sensor, a pressure sensor configured to detect a vapor pressure; and an electronic control unit. The electronic control unit is configured to determine whether or not there is an abnormality in the tank internal pressure sensor based on a change in the vapor pressure in changing over the sealing valve from a closed state to an open state, when an amount of change in the tank pressure in changing over the sealing valve from the closed state to the open state is lower than a first predetermined value.

5 Claims, 5 Drawing Sheets

(56) References Cited

U.S. PATENT DOCUMENTS

2014/0116401 A1* 5/2014 Horiba ............... F02M 25/0809
　　　　　　　　　　　　　　　　　　　　　　　　123/520
2016/0108865 A1* 4/2016 Tagawa .............. F02M 25/0809
　　　　　　　　　　　　　　　　　　　　　　　　123/519

* cited by examiner

EVAPORATIVE FUEL TREATMENT APPARATUS AND CONTROL METHOD FOR EVAPORATIVE FUEL TREATMENT APPARATUS

INCORPORATION BY REFERENCE

The disclosure of Japanese Patent Application No. 2018-103803 filed on May 30, 2018 including the specification, drawings and abstract is incorporated herein by reference in its entirety.

BACKGROUND

1. Technical Field

The disclosure relates to an evaporative fuel treatment apparatus and a control method for an evaporative fuel treatment apparatus.

2. Description of Related Art

An evaporative fuel treatment apparatus of Japanese Patent Application Publication No. 2016-079851 (JP 2016-079851 A) is equipped with a canister that adsorbs evaporative fuel produced in a fuel tank. The canister is connected to the fuel tank via a vapor passage. An outside air introduction passage that introduces outside air into the canister is connected to the canister. The canister is connected to an intake passage via a purge passage. A sealing valve that opens/closes a flow channel of the vapor passage is attached to the vapor passage. Besides, a tank internal pressure sensor that detects a pressure inside the fuel tank is attached to the fuel tank.

In the evaporative fuel treatment apparatus of Japanese Patent Application Publication No. 2016-079851 (JP 2016-079851 A), it is determined whether or not there is an abnormality in the tank internal pressure sensor, in changing over the sealing valve from its open state to its closed state or from its closed state to its open state. In concrete terms, in the evaporative fuel treatment apparatus of Japanese Patent Application Publication No. 2016-079851 (JP 2016-079851 A), when the detection value of the tank internal pressure sensor is held close to an upper limit or a lower limit in changing over the sealing valve, it is determined that there is an abnormality in the tank internal pressure sensor with the detection value thereof being held equal to a constant value.

SUMMARY

In the tank internal pressure sensor of the evaporative fuel treatment apparatus, there may occur an abnormality with the detection value of the tank internal pressure sensor being held equal to an intermediate value between the upper limit and the lower limit (e.g., a detection value close to the atmospheric pressure), as well as the abnormality with the detection value of the tank internal pressure sensor being held equal to the constant value close to the upper limit or the lower limit. However, the evaporative fuel treatment apparatus of Japanese Patent Application Publication No. 2016-079851 (JP 2016-079851 A) does not deal with the possibility of the abnormality with the detection value of the tank internal pressure sensor being held equal to the intermediate value regardless of an actual pressure in the fuel tank. Accordingly, when the abnormality with the detection value of the tank internal pressure sensor being thus held equal to the intermediate value occurs, the evaporative fuel treatment apparatus of Japanese Patent Application Publication No. 2016-079851 (JP 2016-079851 A) may not be able to detect the abnormality appropriately.

A first aspect of the disclosure provides an evaporative fuel treatment apparatus including a canister that adsorbs evaporative fuel, a vapor passage that is connected to the canister, an outside air introduction passage that is connected to the canister, a purge passage that connects the canister and an intake passage to each other, a sealing valve that is provided in the vapor passage, a tank internal pressure sensor, a pressure sensor, and an electronic control unit. The vapor passage introduces evaporative fuel produced in a fuel tank into the canister. The outside air introduction passage introduces outside air into the canister. The sealing valve is configured to open or close a flow channel of the vapor passage. The tank internal pressure sensor is configured to detect a tank pressure as a pressure inside the fuel tank. The pressure sensor is provided in at least one of the canister and a region of the vapor passage located on the canister side with respect to the sealing valve. The pressure sensor is configured to detect a vapor pressure as a pressure in the flow channel of the vapor passage. The electronic control unit is configured to detect the tank pressure based on a signal input from the tank internal pressure sensor, and detect the vapor pressure based on a signal input from the pressure sensor. The electronic control unit is configured to determine whether or not there is an abnormality in the tank internal pressure sensor, based on the detected tank pressure and the detected vapor pressure. The electronic control unit is configured to perform control to open or close the sealing valve. The electronic control unit is configured to determine whether or not there is an abnormality in the tank internal pressure sensor, based on a change in the vapor pressure in changing over the sealing valve from a closed state to an open state, when the electronic control unit determines that an amount of change in the tank pressure in changing over the sealing valve from the closed state to the open state is lower than a first predetermined value set in advance.

In the aforementioned configuration, when the sealing valve is changed over from its closed state to its open state, gas flows through the vapor passage, the canister, and the outside air introduction passage, and the pressure inside the fuel tank changes in such a manner as to approach the atmospheric pressure. Therefore, in the case where the tank internal pressure sensor is normal, the detection value of the pressure sensor also changes when the detection value of the tank internal pressure sensor changes. On the other hand, in the case where there is an abnormality in the tank internal pressure sensor, the detection value of the tank internal pressure sensor does not change, and the detection value of the pressure sensor changes. Accordingly, in the aforementioned configuration, even when there occurs an abnormality with the detection value of the tank internal pressure sensor being held equal to a constant value between an upper limit and a lower limit, the abnormality in the tank internal pressure sensor can be determined based on a change in the detection value of the pressure sensor.

In the aforementioned evaporative fuel treatment apparatus, the electronic control unit may be configured to determine that the tank internal pressure sensor is abnormal, when the amount of change in the vapor pressure in changing over the sealing valve from the closed state to the open state is equal to or higher than a second predetermined value set in advance.

In the aforementioned configuration, it can be restrained from being erroneously determined that there is an abnormality in the tank internal pressure sensor on the ground that the amount of change in the detection value of the pressure sensor has changed by a slight amount that does not reflect whether the tank internal pressure sensor is normal or abnormal.

In the aforementioned evaporative fuel treatment apparatus, the electronic control unit may be configured to make a valve-opening speed in changing over the sealing valve from the closed state to the open state lower when the tank pressure with the sealing valve in the closed state is higher than an atmospheric pressure than when the tank pressure with the sealing valve in the closed state is lower than the atmospheric pressure.

In the aforementioned configuration, when the sealing valve is changed over from its closed state to its open state in the case where the tank pressure is higher than the atmospheric pressure, an excessively large amount of evaporative fuel may flow into the canister within a short period of time. In the aforementioned configuration, the valve-opening speed in changing over the sealing valve from its closed state to its open state in the case where the tank pressure is higher than the atmospheric pressure is set low, so an excessively large amount of evaporative fuel can be restrained from flowing into the canister within a short period of time.

In the aforementioned evaporative fuel treatment apparatus, the sealing valve may include a valve body, a valve element, a sealing member, and a step motor. The valve body may define part of the vapor passage. The valve element may be provided inside the valve body, and may be configured to open or close a flow channel of the valve body. The sealing member may be fixed to at least one of the valve body and the valve element, and may elastically deform while being sandwiched between the valve body and the valve element when the flow channel of the valve body is in its closed state. The step motor may be configured to move the valve element. The electronic control unit may be configured to perform a valve opening/closing process for driving the step motor each time by a predetermined step number, in changing over the sealing valve from the closed state to the open state. The electronic control unit may be configured to learn a position of the valve body at the time when an amount of change in the vapor pressure in performing the valve opening/closing process becomes equal to or higher than a third predetermined value set in advance, as a valve-opening position of the sealing valve.

In the aforementioned configuration, the valve-opening position of the sealing valve can be more accurately learned than, for example, in the configuration for learning the valve-opening position of the sealing valve based on the amount of change in the tank pressure.

A second aspect of the disclosure provides a control method for an evaporative fuel treatment apparatus. The evaporative fuel treatment apparatus includes a canister that adsorbs evaporative fuel, a vapor passage that is connected to the canister, an outside air introduction passage that is connected to the canister, a purge passage that connects the canister and an intake passage to each other, a sealing valve that is provided in the vapor passage, a tank internal pressure sensor, a pressure sensor, and an electronic control unit. The vapor passage introduces evaporative fuel produced in a fuel tank into the canister. The outside air introduction passage introduces outside air into the canister. The sealing valve is configured to open or close a flow channel of the vapor passage. The tank internal pressure sensor is configured to detect a tank pressure as a pressure inside the fuel tank. The pressure sensor is provided in at least one of the canister and a region of the vapor passage located on the canister side with respect to the sealing valve. The pressure sensor is configured to detect a vapor pressure as a pressure in the flow channel of the vapor passage. The control method includes: detecting, by the electronic control unit, the tank pressure based on a signal input from the tank internal pressure sensor; detecting, by the electronic control unit, the vapor pressure based on a signal input from the pressure sensor; determining, by the electronic control unit, whether or not there is an abnormality in the tank internal pressure sensor, based on the detected tank pressure and the detected vapor pressure; performing, by the electronic control unit, control to open or close the sealing valve; and determining, by the electronic control unit, whether or not there is an abnormality in the tank internal pressure sensor, based on a change in the vapor pressure in changing over the sealing valve from the closed state to the open state, when the electronic control unit determines that an amount of change in the tank pressure in changing over the sealing valve from the closed state to the open state is lower than a first predetermined value set in advance.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The embodiment of the disclosure will be described hereinafter with reference to FIGS. 1 to 5C. First of all, the schematic configuration of an internal combustion engine 100 to which the disclosure is applied will be described. Incidentally, in the following description, the simple mention of "upstream" and "downstream" means "upstream" and "downstream" in a direction in which intake air, exhaust gas, evaporative fuel, and outside air flow.

Figure 1:
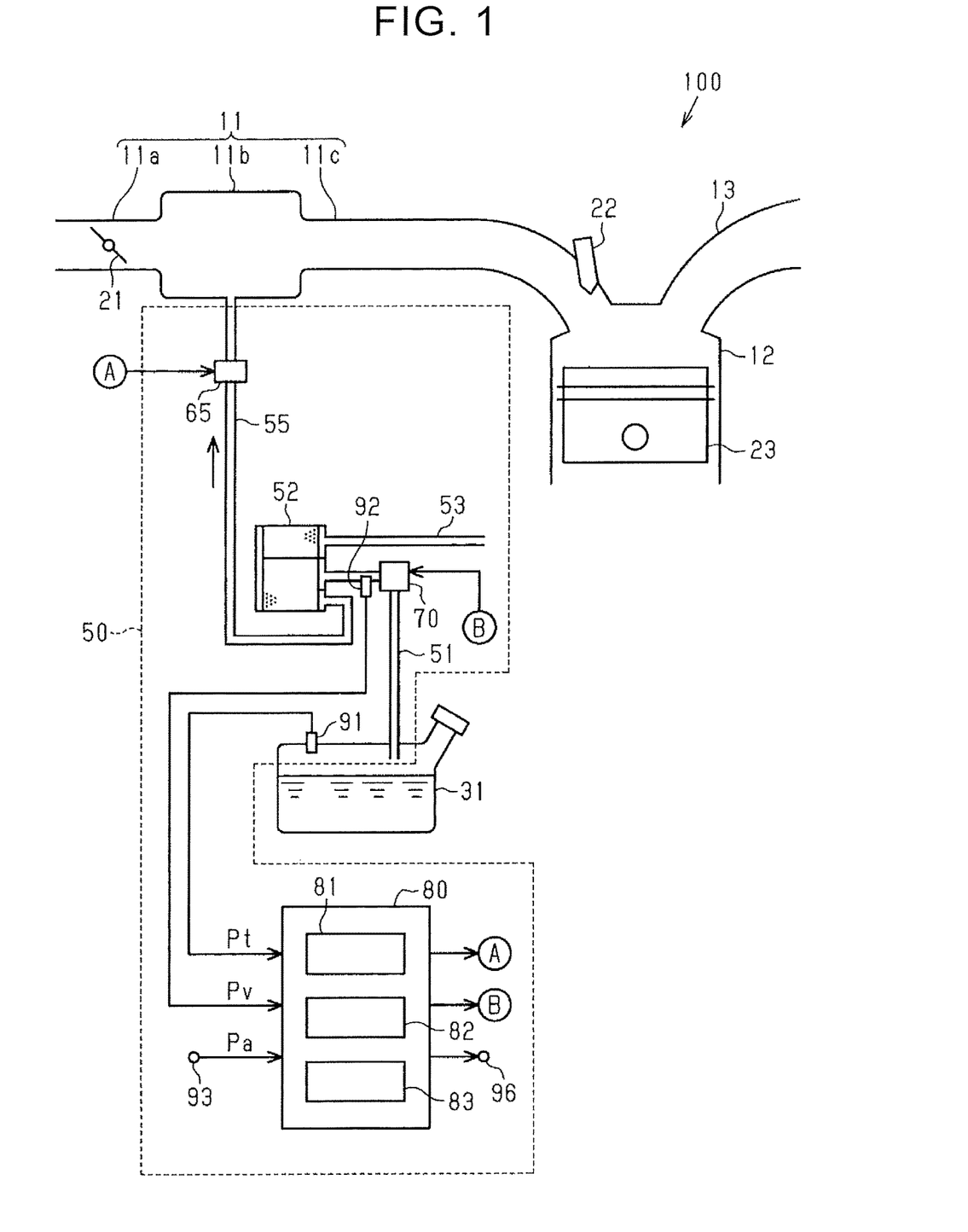
FIG. 1 is a schematic view of an internal combustion engine.

As shown in FIG. 1, the internal combustion engine 100 is equipped with an intake passage 11 for introducing intake air from outside the internal combustion engine 100. A throttle valve 21 is arranged in an upstream intake passage 11a as part of the intake passage 11. The throttle valve 21 controls the amount of intake air flowing through a flow channel of the upstream intake passage 11a by opening/closing the flow channel of the upstream intake passage 11a.

A downstream side of the upstream intake passage 11a is connected to a surge tank 11b for suppressing the pulsation of intake air and the like. A downstream side of the surge tank 11b in the intake passage 11 is connected to a downstream intake passage 11c in the intake passage 11.

A downstream side of the downstream intake passage 11c in the intake passage 11 is connected to a cylinder 12 in which fuel is mixed with intake air and burned. Fuel is injected into the cylinder 12 by a fuel injection valve 22. Besides, a piston 23 that moves in a reciprocating manner inside the cylinder 12 is arranged inside the cylinder 12. An exhaust passage 13 for discharging exhaust gas from the cylinder 12 is connected to the cylinder 12.

The internal combustion engine 100 is equipped with a fuel tank 31 that stores fuel to be supplied to the aforementioned fuel injection valve 22. Although not shown in the drawing, a feed pump is accommodated in the fuel tank 31, and the fuel force-fed by the feed pump is supplied to the fuel injection valve 22 via a fuel pipeline.

An evaporative fuel treatment apparatus 50 that restrains evaporative fuel produced in the fuel tank 31 from being discharged to the atmosphere is connected to the fuel tank 31. The evaporative fuel treatment apparatus 50 is equipped with a canister 52 that adsorbs evaporative fuel produced in the fuel tank 31. One end of a vapor passage 51 that introduces evaporative fuel into the canister 52 is connected to the canister 52. The other end of the vapor passage 51 reaches the inside of the fuel tank 31. A sealing valve 70 that changes over a flow channel of the vapor passage 51 to one of its open state and its closed state is attached to a non-end portion of the vapor passage 51.

An outside air introduction passage 53 that introduces outside air into the canister 52 is connected to the canister 52. Besides, a purge passage 55 that links the canister 52 and the surge tank 11b with each other is connected to the canister 52. A purge valve 65 that changes over a flow channel of the purge passage 55 to one of its open state and its closed state is attached to a non-end portion of the purge passage 55.

A tank internal pressure sensor 91 that detects a tank pressure Pt as a pressure inside the fuel tank 31 is attached to the fuel tank 31. Besides, a pressure sensor 92 that detects a vapor pressure Pv as a pressure in the flow channel of the vapor passage 51 is attached to a region of the vapor passage 51 located on the canister 52 side with respect to the sealing valve 70. Incidentally, this tank internal pressure sensor 91 and this pressure sensor 92 constitute part of the evaporative fuel treatment apparatus 50.

Figure 2:
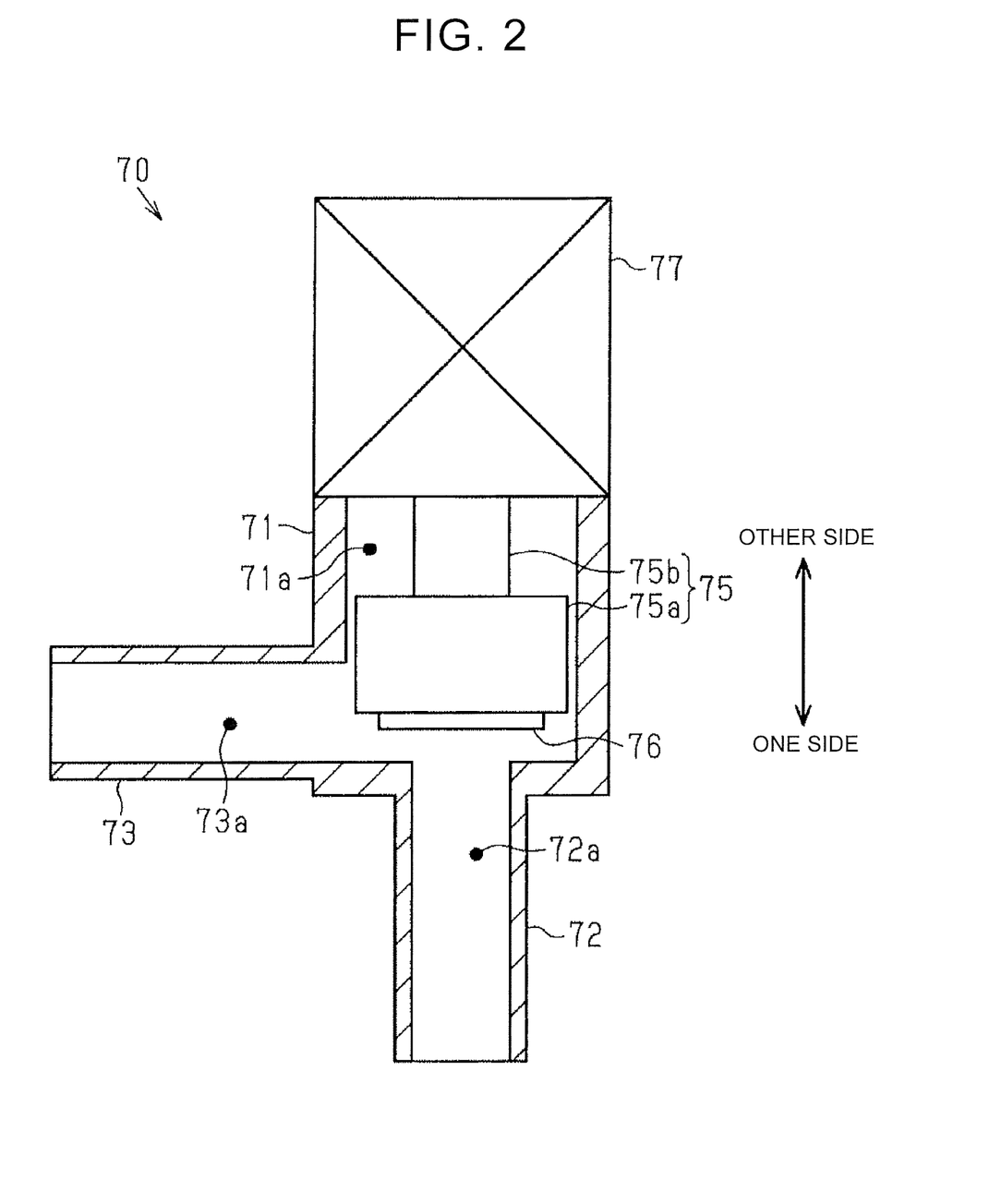
FIG. 2 is a schematic cross-sectional view of a sealing valve.

Next, the configuration of the sealing valve 70 will be concretely described. As shown in FIG. 2, the sealing valve 70 is equipped with a valve body 71 in which a valve element 75 is accommodated. The valve body 71 assumes the appearance of a circular cylinder as a whole, and an internal space 71a capable of accommodating the valve element 75 is defined inside the valve body 71. In the present embodiment, the internal space 71a of the valve body 71 substantially assumes the shape of a circular cylinder extending in an axial direction of the valve body 71 (a vertical direction in FIG. 2).

A first connection portion 72 that substantially assumes the shape of a circular cylinder protrudes from one end surface (on a lower side in FIG. 2) of the valve body 71, in the axial direction of the valve body 71. A central axis of the first connection portion 72 is substantially coaxial with a central axis of the valve body 71. An internal space 72a of the first connection portion 72 communicates with the internal space 71a of the valve body 71. The first connection portion 72 has an inner diameter that is smaller than an inner diameter of the valve body 71. A pipeline that defines the vapor passage 51 located on the fuel tank 31 side with respect to the sealing valve 70 is connected to the first connection portion 72.

A second connection portion 73 that substantially assumes the shape of a circular cylinder protrudes from an outer peripheral surface of the valve body 71. The second connection portion 73 is located at one end portion (on the lower side in FIG. 2) of the valve body 71. An internal space 73a of the second connection portion 73 communicates with the internal space 71a of the valve body 71. The second connection portion 73 has an inner diameter that is approximately equal to an inner diameter of the first connection portion 72. A pipeline that defines the vapor passage 51 located on the canister 52 side with respect to the sealing valve 70 is connected to the second connection portion 73. In the present embodiment, the internal space 72a of the first connection portion 72, the internal space 71a of the valve body 71, and the internal space 73a of the second connection portion 73 in the sealing valve 70 constitute part of the vapor passage 51.

A step motor 77 for driving the valve element 75 is fixed to the other end surface (on an upper side in FIG. 2) in the axial direction of the valve body 71. By performing energization control of the step motor 77 in accordance with a pulse-wave control signal, an output shaft of the step motor 77 rotates by an angle corresponding to one step for each pulse. In FIG. 2, the configuration of the step motor 77 is depicted in a simplified manner.

A valve shaft 75b of the valve element 75 that opens/closes a flow channel of the valve body 71 is coupled to the output shaft of the step motor 77. The valve shaft 75b substantially assumes the shape of a rod. A valve portion 75a that substantially assumes the shape of a circular cylinder is fixed to a distal end (an end on the opposite side of the step motor 77) of the valve shaft 75b. The valve portion 75a is located in the internal space 71a of the valve body 71. The valve portion 75a has an outer diameter that is slightly smaller than the inner diameter of the valve body 71 and that is larger than the inner diameter of the first connection portion 72. A central axis of the valve portion 75a is substantially coaxial with the central axis of the valve body 71. A sealing member 76 that substantially assumes the shape of a circular plate is fixed to one end surface (on the lower side in FIG. 2) of the valve portion 75a of the valve element 75. The sealing member 76 has an outer diameter that is slightly smaller than the outer diameter of the valve portion 75a and that is larger than the inner diameter of the first connection portion 72. The sealing member 76 is made of an elastically deformable material, which is fluoro rubber (FKM) in the present embodiment.

In the case where the sealing valve 70 is in its closed state, the output shaft of the step motor 77 rotates, and the valve element 75 consequently moves toward one side (on the lower side in FIG. 2) in the axial direction of the valve body 71. Then, the sealing member 76 elastically deforms while being sandwiched between an end surface of the valve element 75 and an inner surface of the valve body 71. Thus, an opening on the first connection portion 72 side in the internal space 71a of the valve body 71 is closed up, and the flow channel of the valve body 71 is rendered in its closed state.

On the other hand, in the case where the sealing valve 70 is in its open state, the output shaft of the step motor 77 rotates, and the valve element 75 consequently moves toward the other side (on the upper side in FIG. 2) in the axial direction of the valve body 71. Then, the sealing member 76 separates from the inner surface of the valve body 71. Thus, the opening on the first connection portion 72 side in the internal space 71a of the valve body 71 is opened, and the flow channel of the valve body 71 is rendered in its open state.

As shown in FIG. 1, the above-mentioned purge valve 65 and the above-mentioned sealing valve 70 are controlled to be opened/closed by an electronic control unit 80. In this case, with a view to explaining the kinds of control performed by the electronic control unit 80 for descriptive purposes, the respective kinds of control will be described, from a functional point of view, as being performed by a valve control unit 81, a pressure detection unit 82, and a determination unit 83. The electronic control unit 80 is equipped with the valve control unit 81 for performing control to open or close the purge valve 65 and the sealing valve 70. The valve control unit 81 outputs, to the purge valve 65, a control signal for performing control to open/close the purge valve 65. When a request for a purge treatment for causing the evaporative fuel adsorbed inside the canister 52 to flow through the intake passage 11 via the purge passage 55 is made, the valve control unit 81 controls the purge valve 65 to its open state. Besides, the valve control unit 81 outputs, to the sealing valve 70, a control signal for performing control to open or close the sealing valve 70. In concrete terms, the valve control unit 81 outputs a pulse-wave control signal for driving the output shaft of the step motor 77 in the sealing valve 70 in a circumferential direction of the output shaft at a predetermined step number. Then, the step motor 77 in the sealing valve 70 is controlled, and the output shaft of the step motor 77 rotates toward one or the other side in the circumferential direction of the output shaft, at a step number corresponding to the number of pulses of the control signal. Then, the valve element 75 in the sealing valve 70 is moved, and the flow channel of the valve body 71 assumes its open state or its closed state.

In the case where the absolute value of a difference between the tank pressure Pt and an atmospheric pressure Pa is low etc., the valve control unit 81 controls the sealing valve 70 to its closed state. Besides, in the case where the purge valve 65 is in its open state, the valve control unit 81 controls the sealing valve 70 to its open state when the tank pressure Pt is significantly higher than the atmospheric pressure Pa or when the tank pressure Pt is significantly lower than the atmospheric pressure Pa. In the present embodiment, the electronic control unit 80 is configured as an electronic control unit (an ECU) that is configured to control the internal combustion engine 100 as a whole, that is, to control the opening degree of the throttle valve 21, the fuel injection amount of the fuel injection valve 22, and the like, in addition to controlling the above-mentioned sealing valve 70 and the above-mentioned purge valve 65.

The electronic control unit 80 is equipped with the pressure detection unit 82 that detects pressures of the respective portions, and the determination unit 83 that determines whether or not there is an abnormality in the tank internal pressure sensor 91. The pressure detection unit 82 detects the tank pressure Pt based on a signal input from the tank internal pressure sensor 91. The pressure detection unit 82 detects the vapor pressure Pv based on a signal input from the pressure sensor 92. The pressure detection unit 82 detects the atmospheric pressure Pa based on a signal input from an atmospheric pressure sensor 93 that detects a pressure of the atmosphere. The atmospheric pressure sensor 93 is installed at a position exposed to no wind pressure resulting from the running of the vehicle, for example, in an engine room or the like of the vehicle.

The determination unit 83 determines, based on the tank pressure Pt and the vapor pressure Pv that have been detected by the pressure detection unit 82, whether or not there is an abnormality in the tank internal pressure sensor 91. Besides, a warning lamp 96 for notifying a driver or the like of an abnormality in the tank internal pressure sensor 91 is electrically connected to the electronic control unit 80. The warning lamp 96 lights up when a signal is output from the electronic control unit 80. The warning lamp 96 is attached to, for example, an instrument panel inside the vehicle.

Figure 3:
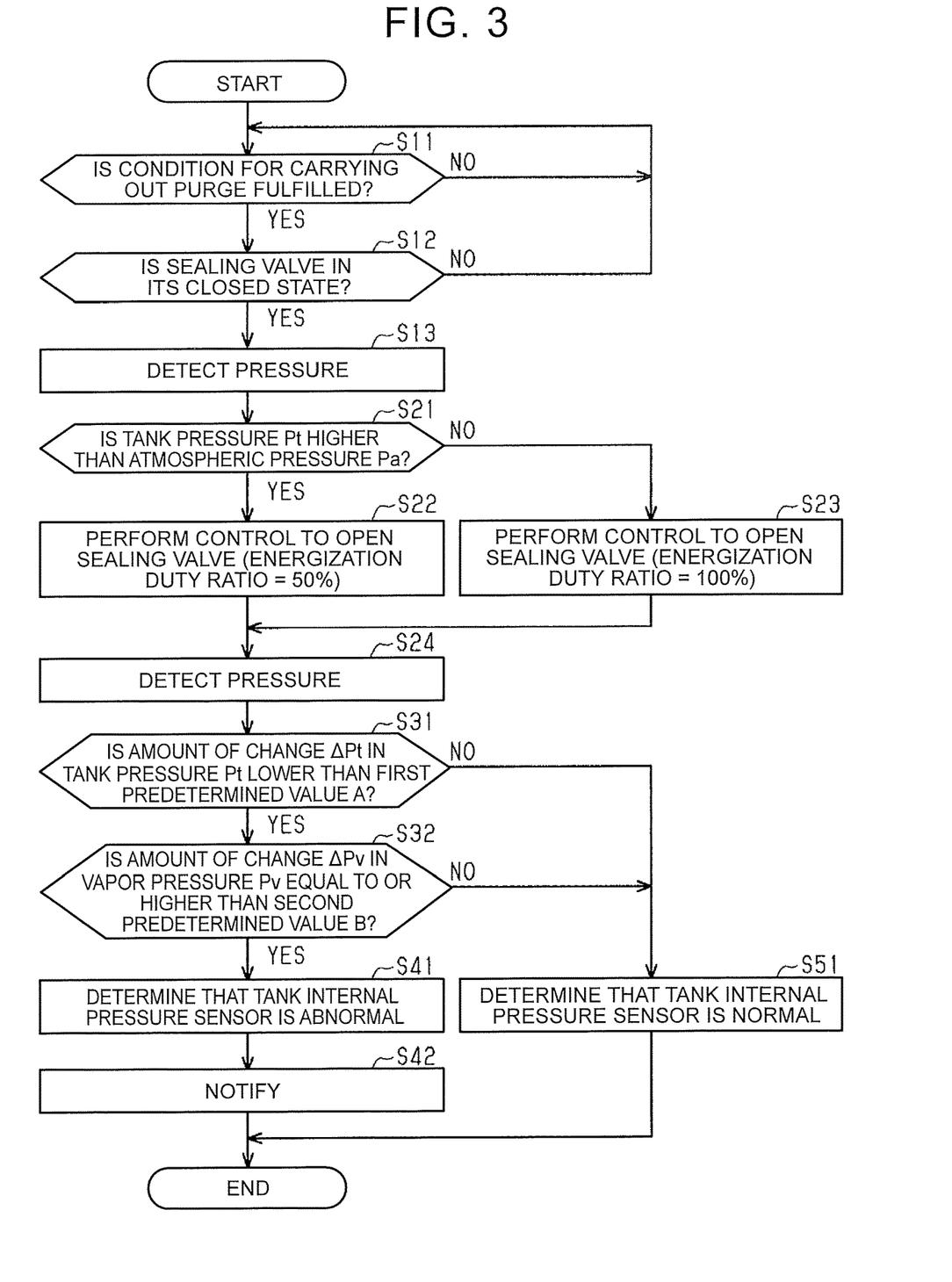
FIG. 3 is a flowchart showing an abnormality determination process.

Next, an abnormality determination process that is performed by the electronic control unit 80 to determine whether or not there is an abnormality in the tank internal pressure sensor 91 will be described. The electronic control unit 80 performs the abnormality determination process every time a system activation switch (which may also be referred to as an ignition switch or a main switch) for the vehicle is operated to be turned on, namely, every time the electronic control unit 80 starts operating.

As shown in FIG. 3, when the abnormality determination process is started, the electronic control unit 80 performs the processing of step S11. In step S11, the electronic control unit 80 determines whether or not a condition for carrying out purge is fulfilled. As the condition for carrying out purge, it is possible to mention that the engine rotational speed of the internal combustion engine 100 is equal to or higher than a rotational speed at which the operation thereof can be continued in an autonomous manner (an idling rotational speed), that a fuel cut process for temporarily stopping the injection of fuel from the fuel injection valve 22 is not being performed at the time of deceleration or the like of the vehicle, and the like. When it is determined in step S11 that the condition for carrying out purge is not fulfilled (NO in S11), the electronic control unit 80 repeatedly performs the processing of step S11. On the other hand, when it is determined in step S11 that the condition for carrying out purge is fulfilled (YES in S11), the electronic control unit 80 advances the process to step S12.

In step S12, the electronic control unit 80 determines whether or not the sealing valve 70 is in its closed state. When it is determined in step S12 that the sealing valve 70 is not in its closed state (NO in S12), the electronic control unit 80 returns the process to step S11. On the other hand, when it is determined in step S12 that the sealing valve 70 is in its closed state (YES in S12), the electronic control unit 80 advances the process to step S13.

In step S13, the pressure detection unit 82 in the electronic control unit 80 detects and stores the tank pressure Pt, the vapor pressure Pv, and the atmospheric pressure Pa. After that, the electronic control unit 80 advances the process to step S21.

In step S21, the electronic control unit 80 determines whether or not the tank pressure Pt stored in step S13 is higher than the atmospheric pressure Pa. If it is determined in step S21 that the tank pressure Pt is higher than the atmospheric pressure Pa (YES in S21), the electronic control unit 80 advances the process to step S22.

In step S22, the valve control unit 81 in the electronic control unit 80 performs control in such a manner as to change over the sealing valve 70 from its closed state to its open state. In concrete terms, the valve control unit 81 outputs, to the step motor 77, a control signal whose number of pulses corresponds to a step number for changing over the sealing valve 70 from its closed state to its open state, and rotates the output shaft of the step motor 77 in such a manner as to move the valve element 75 toward its open side. The step motor 77 is changed over between its energized state and its non-energized state through pulse width modulation (PWM) control. In the present embodiment, the energization duty ratio as a ratio of a time of the energized state to a time of one cycle (one pulse cycle) on which the step motor 77 is changed over between its energized state and its non-energized state is set equal to about 50%. After that, the electronic control unit 80 advances the process to step S24.

On the other hand, when it is determined in step S21 that the tank pressure Pt is equal to or lower than the atmospheric pressure Pa (NO in S21), the electronic control unit 80 advances the process to step S23. In step S23, the valve control unit 81 in the electronic control unit 80 performs control in such a manner as to change over the sealing valve 70 from its closed state to its open state. In concrete terms, the valve control unit 81 outputs, to the step motor 77, a control signal whose number of pulses corresponds to the step number for changing over the sealing valve 70 from its closed state to its open state, and rotates the output shaft of the step motor 77 in such a manner as to move the valve element 75 toward its open side. In the present embodiment, when the sealing valve 70 is changed over from its closed state to its open state in step S23, the energization duty ratio is set equal to 100%, unlike the case of the above-mentioned step S22. That is, in the processing of step S23, the speed at which the valve element 75 of the sealing valve 70 is opened in changing over the sealing valve 70 from its closed state to its open state is set higher in the processing of step S23 than in the processing of step S22. After that, the electronic control unit 80 advances the process to step S24.

In step S24, the pressure detection unit 82 in the electronic control unit 80 detects and stores the tank pressure Pt, the vapor pressure Pv, and the atmospheric pressure Pa again. After that, the electronic control unit 80 advances the process to step S31.

In step S31, the determination unit 83 in the electronic control unit 80 determines whether or not an amount of change ΔPt in the tank pressure Pt in changing over the sealing valve 70 from its closed state to its open state is lower than a first predetermined value A set in advance. In concrete terms, the determination unit 83 defines the amount of change ΔPt as an absolute value of a difference between the tank pressure Pt detected in step S13 with the sealing valve 70 in its closed state and the tank pressure Pt detected in step S24 with the sealing valve 70 in its open state, and determines whether or not this value is lower than the first predetermined value A. It should be noted herein that even when the pressure inside the fuel tank 31 is constant as a whole, the detection value of the tank internal pressure sensor 91 may slightly fluctuate due to local fluctuations in pressure resulting from the swinging of the fuel in the fuel tank 31, and the detection value of the tank internal pressure sensor 91 may slightly fluctuate due to external noise. In view of this, a value larger than an amount of slight fluctuations as mentioned above is set in advance as the first predetermined value A. When it is determined in step S31 that the amount of change ΔPt in the tank pressure Pt in changing over the sealing valve 70 from its closed state to its open state is lower than the first predetermined value A (YES in S31), the electronic control unit 80 advances the process to step S32.

In step S32, the determination unit 83 in the electronic control unit 80 determines whether or not an amount of change ΔPv in the vapor pressure Pv in changing over the sealing valve 70 from its closed state to its open state is equal to or higher than a second predetermined value B set in advance. In concrete terms, the determination unit 83 defines the amount of change ΔPv as an absolute value of a difference between the vapor pressure Pv detected in step S13 with the sealing valve 70 in its closed state and the vapor pressure Pv detected in step S24 with the sealing valve 70 in its open state, and determines whether or not this value is equal to or higher than the second predetermined value B. It should be noted herein that even when the pressure in the vapor passage 51 located on the canister 52 side with respect to the sealing valve 70 is constant as a whole, the detection value of the pressure sensor 92 may slightly fluctuate, as is the case with the above-mentioned tank internal pressure sensor 91. A value larger than an amount of such slight fluctuations is set in advance as the second predetermined value B. When it is determined in step S32 that the amount of change ΔPv in the vapor pressure Pv in changing over the sealing valve 70 from its closed state to its open state is equal to or higher than the second predetermined value B set in advance (YES in S32), the electronic control unit 80 advances the process to step S41.

In step S41, the determination unit 83 in the electronic control unit 80 determines that the tank internal pressure sensor 91 is abnormal. The valve control unit 81 in the electronic control unit 80 performs control in such a manner as to change over the sealing valve 70 from its open state to its closed state. After that, the electronic control unit 80 advances the process to step S42. In step S42, the determination unit 83 in the electronic control unit 80 outputs a signal to the warning lamp 96 to light up the warning lamp 96. Incidentally, after it is determined in step S41 that the tank internal pressure sensor 91 is abnormal, the warning lamp 96 remains lit up during the operation of the electronic control unit 80, until it is determined in later-described step S51 that the tank internal pressure sensor 91 is normal. After that, the electronic control unit 80 ends the abnormality determination process.

On the other hand, when it is determined in step S31 that the amount of change ΔPt in the tank pressure Pt in changing over the sealing valve 70 from its closed state to its open state is not lower than the first predetermined value A set in advance (NO in S31), the electronic control unit 80 advances the process to step S51. Besides, when it is determined in step S32 that the amount of change ΔPv in the vapor pressure Pv in changing over the sealing valve 70 from its closed state to its open state is not equal to or higher than the second predetermined value B set in advance (NO in S32), the electronic control unit 80 advances the process to step S51.

In step S51, the determination unit 83 in the electronic control unit 80 determines that the tank internal pressure sensor 91 is normal. Besides, the valve control unit 81 in the electronic control unit 80 performs control in such a manner as to change over the sealing valve 70 from its open state to its closed state. Incidentally, when the warning lamp 96 is lit up at the time point of step S51, the warning lamp 96 is turned off. After that, the electronic control unit 80 ends the abnormality determination process.

Figure 4:
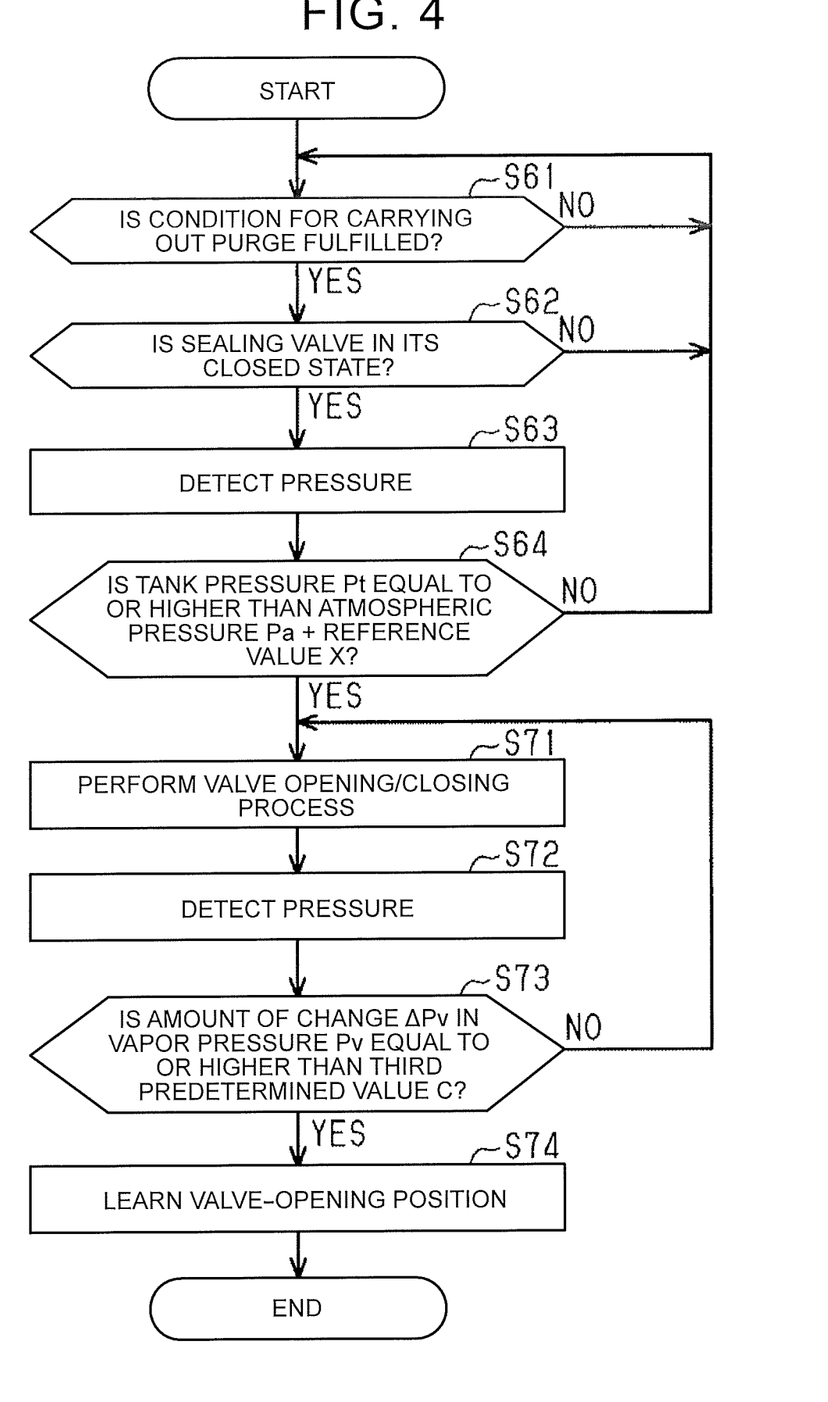
FIG. 4 is a flowchart showing a valve-opening position learning process.

Next, a valve-opening position learning process that is performed by the electronic control unit 80 to learn a valve-opening position of the sealing valve 70 will be described. The electronic control unit 80 performs the valve-opening position learning process when it is determined in the abnormality determination process that the tank internal pressure sensor 91 is normal.

As shown in FIG. 4, when the valve-opening position learning process is started, the electronic control unit 80 performs the processing of step S61. In step S61, the electronic control unit 80 determines whether or not the condition for carrying out purge is fulfilled. In this embodiment, the condition for carrying out purge in step S61 is the same as the condition for carrying out purge in step S11 in the above-mentioned abnormality determination process. When it is determined in step S61 that the condition for carrying out purge is not fulfilled (NO in S61), the electronic control unit 80 repeatedly performs the processing of step S61. On the other hand, when it is determined in step S61 that the condition for carrying out purge is fulfilled (YES in S61), the electronic control unit 80 advances the process to step S62.

In step S62, the electronic control unit 80 determines whether or not the sealing valve 70 is in its closed state. When it is determined in step S62 that the sealing valve 70 is not in its closed state (NO in S62), the electronic control unit 80 returns the process to step S61. On the other hand, when it is determined in step S62 that the sealing valve 70 is in its closed state (YES in S62), the electronic control unit 80 advances the process to step S63.

In step S63, the pressure detection unit 82 in the electronic control unit 80 detects and stores the tank pressure Pt, the vapor pressure Pv, and the atmospheric pressure Pa. After that, the electronic control unit 80 advances the process to step S64.

In step S64, the electronic control unit 80 determines whether or not the tank pressure Pt stored in step S63 is higher than the atmospheric pressure Pa by a reference value X or more. It should be noted herein that the reference value X is determined as a value at which the pressure in the vapor passage 51 downstream of the sealing valve 70 can fluctuate as a result of the flow of evaporative fuel through the vapor passage 51 even in the case where the sealing valve 70 has slightly opened, and that the reference value X is determined as about several % of the atmospheric pressure Pa. When it is determined in step S64 that the tank pressure Pt is not higher than the atmospheric pressure Pa by the reference value X or more (NO in S64), the electronic control unit 80 returns the process to step S61. On the other hand, when it is determined in step S64 that the tank pressure Pt is higher than the atmospheric pressure Pa by the reference value X or more (YES in S64), the electronic control unit 80 advances the process to step S71.

In step S71, the valve control unit 81 in the electronic control unit 80 performs a valve opening/closing process for driving the step motor 77 in such a manner as to move the valve element 75 in the sealing valve 70 toward its open side. In concrete terms, the valve control unit 81 outputs, to the step motor 77, a control signal whose number of pulses corresponds to a predetermined step number set in advance, and rotates the output shaft of the step motor 77 at the predetermined step number in such a manner as to move the valve element 75 toward its open side. In the present embodiment, the predetermined step number in the valve opening/closing process is set equal to one step. After that, the electronic control unit 80 advances the process to step S72.

In step S72, the pressure detection unit 82 in the electronic control unit 80 detects and stores the tank pressure Pt, the vapor pressure Pv, and the atmospheric pressure Pa again. After that, the electronic control unit 80 advances the process to step S73.

In step S73, the determination unit 83 in the electronic control unit 80 determines whether or not the amount of change ΔPv in the vapor pressure Pv in changing over the sealing valve 70 from its closed state to its open state is equal to or higher than a third predetermined value C set in advance. In concrete terms, the determination unit 83 defines the amount of change ΔPv as an absolute value of a difference between the vapor pressure Pv detected in step S63 with the sealing valve 70 in its closed state and the vapor pressure Pv detected in step S72 immediately preceding step S73 with the sealing valve 70 in its open state, and determines whether or not this value is equal to or higher than the third predetermined value C. It should be noted herein that an amount of change by which the pressure in the vapor passage 51 downstream of the sealing valve 70 can fluctuate as soon as the sealing valve 70 changes over from its closed state to its open state is obtained through an experiment or the like in the case where the tank pressure Pt is higher than the atmospheric pressure Pa by the reference value X or more, and that a value lower than the amount of change in pressure is set in advance as the third predetermined value C. When it is determined in step S73 that the amount of change ΔPv in the vapor pressure Pv in changing over the sealing valve 70 from its closed state to its open state is not equal to or higher than the third predetermined value C set in advance (NO in S73), the electronic control unit 80 returns the process to step S71.

On the other hand, when it is determined in step S73 that the amount of change ΔPv in the vapor pressure Pv in changing over the sealing valve 70 from its closed state to its open state is equal to or higher than the third predetermined value C set in advance (YES in S73), the electronic control unit 80 advances the process to step S74.

In step S74, the determination unit 83 in the electronic control unit 80 learns the position of the valve element 75 at the time when it is determined in the valve opening/closing process that the amount of change ΔP in the vapor pressure Pv is equal to or higher than the third predetermined value C set in advance, as the valve-opening position of the sealing valve 70. Besides, the valve control unit 81 in the electronic control unit 80 performs control in such a manner as to change over the sealing valve 70 from its open state to its closed state. After that, the electronic control unit 80 ends the valve-opening position learning process.

The operation of the present embodiment will be described. In the internal combustion engine 100, in the case where the purge treatment for causing evaporative fuel to flow from the canister 52 side to the intake passage 11 side is not carried out, the purge valve 65 is controlled to its closed state. Then, when the sealing valve 70 is controlled to its open state, gas flows through the vapor passage 51. It should be noted herein that when the tank pressure Pt is higher than the atmospheric pressure Pa, the evaporative fuel produced in the fuel tank 31 flows into the canister 52 via the vapor passage 51. Then, the evaporative fuel that has flowed into the canister 52 is adsorbed into the canister 52. In this case, the tank pressure Pt changes in such a manner as to gradually fall and approach the atmospheric pressure Pa. On the other hand, when the tank pressure Pt is lower than the atmospheric pressure Pa, outside air flows into the fuel tank 31 via the outside air introduction passage 53, the canister 52, and the vapor passage 51. In this case, the tank pressure Pt changes in such a manner as to gradually rise and approach the atmospheric pressure Pa.

In the internal combustion engine 100, in the case where the purge treatment for causing evaporative fuel to flow from the canister 52 side to the intake passage 11 side is carried out, the purge valve 65 is controlled to its open state. Then, outside air flows into the canister 52 via the outside air introduction passage 53, due to a negative pressure in a region of the intake passage 11 located downstream of the throttle valve 21. Then, the evaporative fuel adsorbed in the canister 52 and outside air flow into the region of the intake passage 11 located downstream of the throttle valve 21, via the purge passage 55.

When the sealing valve 70 is controlled to its open state in the case where the purge treatment is thus carried out, gas flows through the vapor passage 51. It should be noted herein that when the tank pressure Pt is higher than the atmospheric pressure Pa, the evaporative fuel produced in the fuel tank 31 flows into the canister 52 via the vapor passage 51. Then, the evaporative fuel that has flowed into the canister 52 and outside air flow into the region of the intake passage 11 located downstream of the throttle valve 21, via the purge passage 55. In this case, the tank pressure Pt changes in such a manner as to gradually fall and approach the atmospheric pressure Pa. On the other hand, in the case where the tank pressure Pt is lower than the atmospheric pressure Pa, outside air flows into the fuel tank 31 via the outside air introduction passage 53, the canister 52, and the vapor passage 51. In this case, the tank pressure Pt changes in such a manner as to gradually rise and approach the atmospheric pressure Pa.

Figure 5A:
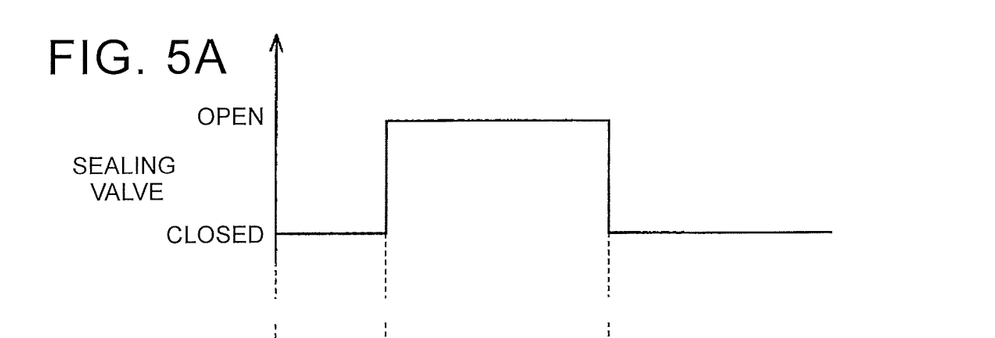
FIG. 5A is a time chart showing a state of the sealing valve in the abnormality determination process.
Figure 5B:
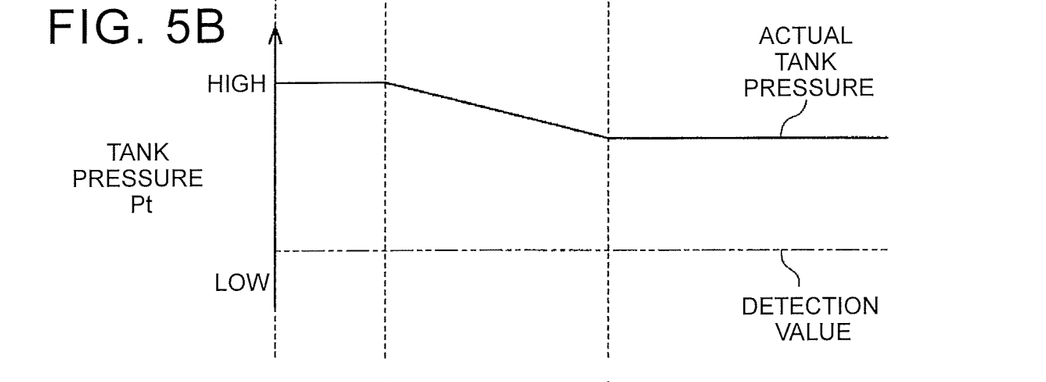
FIG. 5B is a time chart showing changes in tank pressure in the abnormality determination process.

It is assumed herein that there is an abnormality in the tank internal pressure sensor 91 with the detection value of the tank internal pressure sensor 91 being held equal to a constant value that is approximately equal to the atmospheric pressure Pa at and after a timing t0, as indicated by an alternate long and two short dashes line in FIG. 5B. Besides, as indicated by a solid line in FIG. 5B, the actual tank pressure Pt is assumed to be higher than the atmospheric pressure Pa at the timing t0. Furthermore, it is assumed that the abnormality determination process is performed by performing operation to turn on the system activation switch for the vehicle, at the timing t0.

Figure 5C:
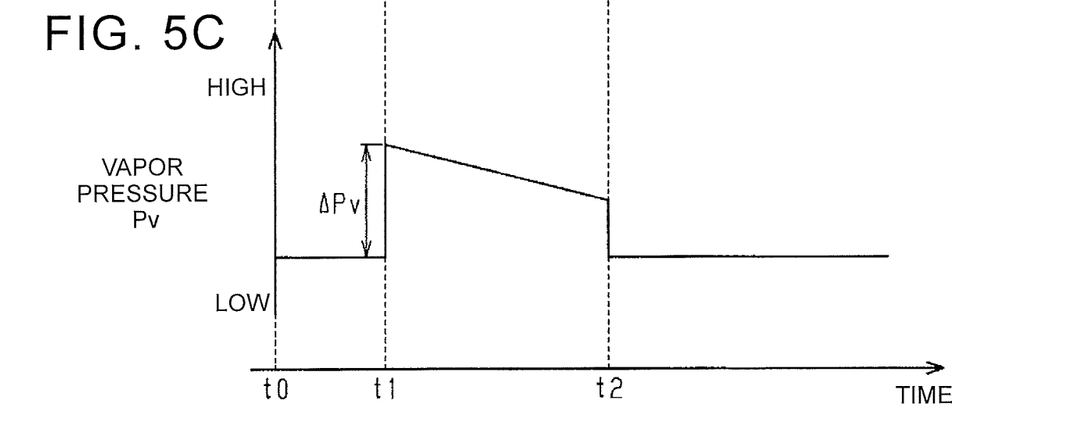
FIG. 5C is a time chart showing changes in vapor pressure in the abnormality determination process.

As shown in FIG. 5A, when the condition for carrying out purge is fulfilled at a timing t1, the sealing valve 70 is changed over from its closed state to its open state. Then, as indicated by the solid line in FIG. 5B, the actual tank pressure Pt changes in such a manner as to gradually fall, from the timing t1 to a timing t2. However, as indicated by the alternate long and two short dashes line in FIG. 5B, there is an abnormality in the tank internal pressure sensor 91, so the detection value of the tank internal pressure sensor 91 does not change from the timing t1 to the timing t2 either. Therefore, the determination unit 83 determines that the amount of change ΔPt in the tank pressure Pt in changing over the sealing valve 70 from its closed state to its open state is lower than the first predetermined value A. On the other hand, as shown in FIG. 5C, the detection value of the pressure sensor 92 changes as the sealing valve 70 is changed over from its closed state to its open state at the timing t1. Therefore, the determination unit 83 determines that the amount of change ΔPv in the vapor pressure Pv in changing over the sealing valve 70 from its closed state to its open state is equal to or higher than the second predetermined value B. Then, the determination unit 83 determines that the tank internal pressure sensor 91 is abnormal. Then, the determination unit 83 outputs a signal to the warning lamp 96 to light up the warning lamp 96. After that, as shown in FIG. 5A, the sealing valve 70 is changed over from its open state to its closed state at the timing t2.

The effect of the present embodiment will be described. In the present embodiment, when the sealing valve 70 is changed over from its closed state to its open state, gas flows through the vapor passage 51, the canister 52, and the outside air introduction passage 53, and the tank pressure Pt changes in such a manner as to approach the atmospheric pressure Pa. Therefore, in the case where the tank internal pressure sensor 91 is normal, the tank pressure Pt detected by the tank internal pressure sensor 91 changes. On the other hand, in the case where there is an abnormality in the tank internal pressure sensor 91 with the detection value of the tank internal pressure sensor 91 being held equal to the constant value, the tank pressure Pt detected by the tank internal pressure sensor 91 does not change.

It should be noted herein that it is conceivable to determine that there is an abnormality in the tank internal pressure sensor 91, for example, when the tank pressure Pt detected by the tank internal pressure sensor 91 is held within a certain range from an upper limit of the tank internal pressure sensor 91 or within a certain range from a lower limit of the tank internal pressure sensor 91. Then, this configuration can also cope with an abnormality with the tank internal pressure sensor 91 keeping detecting an intermediate value located apart from the upper limit or the lower limit to a certain extent instead of a value close to the upper limit or the lower limit, by setting the aforementioned certain range large. However, when the aforementioned certain range is set excessively large, it is likely to be erroneously determined that there is an abnormality in the tank internal pressure sensor 91 even in the case where the tank internal pressure sensor 91 is normal.

In the present embodiment, it is determined whether or not there is an abnormality in the tank internal pressure sensor 91, based on the change in the vapor pressure Pv detected by the pressure sensor 92 as well as the amount of change ΔPt in the tank pressure Pt detected by the tank internal pressure sensor 91. As described above, when the sealing valve 70 is changed over from its closed state to its open state, the tank pressure Pt changes in such a manner as to approach the atmospheric pressure Pa, and as a result, the vapor pressure Pv also changes. This change in the vapor pressure Pv is caused even if there is an abnormality in the tank internal pressure sensor 91. Accordingly, in the present embodiment, even when there is an abnormality in the tank internal pressure sensor 91 with the tank pressure Pt detected by the tank internal pressure sensor 91 being held equal to the constant value, the abnormality in the tank internal pressure sensor 91 can be determined based on the change in the vapor pressure Pv detected by the pressure sensor 92.

It is assumed herein that it is determined that there is an abnormality in the tank internal pressure sensor 91 on the ground that the detection value of the pressure sensor 92 has very slightly changed. In this case, it may be erroneously determined that the tank internal pressure sensor 91 is abnormal, although the tank internal pressure sensor 91 is normal. In the present embodiment, it is determined that there is an abnormality in the tank internal pressure sensor 91, when the amount of change ΔPv in the vapor pressure Pv detected by the pressure sensor 92 is equal to or higher than the second predetermined value B. Therefore, in the present embodiment, it can be restrained from being erroneously determined that there is an abnormality in the tank internal pressure sensor 91 on the ground that the amount of change ΔPv in the vapor pressure Pv detected by the pressure sensor 92 has changed by a slight amount that does not reflect whether the tank internal pressure sensor 91 is normal or abnormal.

By the way, in the present embodiment, when the sealing valve 70 is changed over from its closed state to its open state in the case where the tank pressure Pt is higher than the atmospheric pressure Pa, an excessively large amount of evaporative fuel may flow into the canister 52 within a short period of time. When an excessively large amount of evaporative fuel flows into the canister 52 within a short period of time, a large amount of evaporative fuel is adsorbed by the canister 52, and the canister 52 may become unable to adsorb evaporative fuel afterward in case of necessity. In the present embodiment, the speed at which the sealing valve 70 is changed over from its closed state to its open state is set lower when the tank pressure Pt is higher than the atmospheric pressure Pa than when the tank pressure Pt is lower than the atmospheric pressure Pa in the case where the sealing valve 70 is in its closed state. Therefore, in the present embodiment, the flow rate of gas flowing through the vapor passage 51 becomes relatively low during a transient period in which the sealing valve 70 is being changed over from its closed state to its open state. Accordingly, an excessively large amount of evaporative fuel can be restrained from flowing into the canister 52 from the fuel tank 31 via the vapor passage 51 within a short period of time.

In the aforementioned embodiment, with a view to appropriately adjusting the amount of evaporative fuel flowing through the vapor passage 51, the position of the valve element 75 at the moment when the sealing valve 70 changes over from its closed state to its open state needs to be accurately grasped as the valve-opening position of the sealing valve 70. It should be noted herein that, for example, a configuration for learning the position of the valve element 75 when the sealing valve 70 changes over from its closed state to its open state based on the amount of change ΔPt in the tank pressure Pt in the valve opening/closing process is conceivable, instead of the processing of step S73 in the valve-opening position learning process, as the configuration for learning the valve-opening position of the sealing valve 70. However, the fuel tank 31 generally has a relatively large capacity, so the amount of change ΔPt in the tank pressure Pt tends to be low even when gas flows through the vapor passage 51 after the sealing valve 70 changes over from its closed state to its open state. Therefore, if the valve-opening position learning process is based on the amount of change ΔPt in the tank pressure Pt, it may be impossible to appropriately detect the position of the valve element 75 when the sealing valve 70 changes over from its closed state to its open state.

In the present embodiment, the position of the valve element 75 at the time when the amount of change ΔPv in the vapor pressure Pv in performing the valve opening/closing process becomes equal to or higher than the third predetermined value C set in advance is learned as the valve-opening position of the sealing valve 70. The capacity in the vapor passage 51 is significantly smaller than the capacity of the fuel tank 31, so the change in the vapor pressure Pv in performing the valve opening/closing process is remarkable. Therefore, in the present embodiment, the valve-opening position of the sealing valve 70 can be more accurately learned than in the configuration for learning the valve-opening position of the sealing valve 70 based on the amount of change ΔPt in the tank pressure Pt.

The present embodiment can be carried out after being modified as follows. The present embodiment and the following modification examples can be combined with one another and carried out within such a range that there is no technical contradiction. In the aforementioned embodiment, the configuration for connecting the purge passage 55 to the intake passage 11 can be appropriately changed. For example, in the case where a compressor of a turbocharger is attached to the intake passage 11, the purge passage 55 may be connected to regions of the intake passage 11 located upstream and downstream of the compressor.

In the aforementioned embodiment, the processing of step S32 can be changed. For example, in step S32, it may be determined that the vapor pressure Pv has changed as a result of the changeover of the sealing valve 70, when the speed at which the vapor pressure Pv in changing over the sealing valve 70 from its closed state to its open state changes exceeds a certain speed.

In the aforementioned embodiment, the valve-opening speed of the valve element 75 of the sealing valve 70 in steps S22 and S23 can be changed. For example, the valve-opening speed (the energization duty ratio) of the sealing valve 70 may remain unchanged regardless of whether the tank pressure Pt is higher than the atmospheric pressure Pa or equal to or lower than the atmospheric pressure Pa. For example, in the case where a large amount of evaporative fuel can be adsorbed by the canister 52 for the capacity of the fuel tank 31, there is no problem in particular even when a large amount of evaporative fuel flows into the canister 52 as a result of the changeover of the sealing valve 70 to its open state.

In the aforementioned embodiment, the predetermined step number in step S71 in the valve opening/closing process can be appropriately changed. For example, the predetermined step number in the valve opening/closing process may be set equal to or larger than 2 steps. It should be noted, however, that the predetermined step number in the valve opening/closing process is preferably set small from the standpoint of enhancing the learning accuracy of the valve-opening position learning process.

In the aforementioned embodiment, the processing of step S73 can be changed. For example, in the case where the fuel tank 31 has a relatively small capacity, it may be determined in step S73 whether or not the amount of change ΔPt in the tank pressure Pt in changing over the sealing valve 70 from its closed state to its open state is equal to or higher than the third predetermined value C set in advance.

In the aforementioned embodiment, the timing for performing the abnormality determination process can be changed. For example, while the electronic control unit 80 is in operation, the abnormality determination process may be repeatedly performed on a predetermined cycle (e.g., at intervals of several to several tens of minutes). Besides, the abnormality determination process can also be performed, for example, when the vehicle is parked etc.

In the aforementioned embodiment, the timing for performing the valve-opening position learning process can be changed. For example, while the electronic control unit 80 is in operation after it is determined in the abnormality determination process that the tank internal pressure sensor 91 is normal, the valve-opening position learning process may be repeatedly performed on a predetermined cycle (e.g., at intervals of several to several tens of minutes).

Besides, the valve-opening position learning process may be performed, for example, in step S22 in the abnormality determination process. In concrete terms, the processing of steps S71 to S74 may be incorporated into the processing of step S22, and the position of the valve element 75 at the time when it is determined that the amount of change ΔPv in the vapor pressure Pv is equal to or higher than the third predetermined value C set in advance may be learned as the valve-opening position of the sealing valve 70 in step S22.

In the aforementioned embodiment, the configuration of the sealing valve 70 can be changed. For example, a sealing member 76 may be fixed to the inner surface of the valve body 71 instead of or in addition to the sealing member 76 fixed to the valve element 75. In concrete terms, an annular sealing member 76 may be fixed along an opening edge of the valve body 71 on the first connection portion 72 side. In this case, the sealing member 76 fixed to the valve body 71 elastically deforms while being sandwiched between the end surface of the valve element 75 and the inner surface of the valve body 71 when the sealing valve 70 is in its closed state.

Besides, the material of the sealing member 76 can be appropriately changed as long as it is an elastically deformable material. For example, the material of the sealing member 76 may be replaced by a rubber material other than fluoro rubber (FKM) or a resin material.

In the aforementioned embodiment, the attachment position of the pressure sensor 92 can be changed. For example, a pressure sensor may be attached to the canister 52 instead of or in addition to the pressure sensor 92 attached to the vapor passage 51. In concrete terms, a pump module used to diagnose leakage in the canister 52 is attached to the canister 52 in some cases. Furthermore, as a rule, a pressure sensor for detecting the pressure inside the canister 52, an air pump for reducing the pressure inside the canister 52, and the like are built in this type of pump module. In the case where such a pump module is adopted, the pressure in the canister 52 may be detected by the pressure sensor in the pump module, and the detected pressure may be regarded as a pressure in the flow channel of the vapor passage 51.

In the aforementioned embodiment, the valve-opening position learning process may be omitted. For example, in the case where a position sensor that detects the position of the valve element 75 is provided inside the sealing valve 70, the valve-opening position of the sealing valve 70 can be detected even when the above-mentioned valve-opening position learning process is omitted. Besides, when accurate control is not required in opening/closing the sealing valve 70, the valve-opening position learning process and the configuration for detecting the valve-opening position can be omitted.

In the evaporative fuel treatment apparatus of Japanese Patent Application Publication No. 2016-079851 (JP 2016-079851 A), with a view to accurately adjusting the amount of evaporative fuel flowing through the vapor passage, it is preferable to accurately grasp, as the valve-opening position of the sealing valve, the position of the valve element at the moment when the sealing valve changes over from its closed state to its open state. Furthermore, from the standpoint of learning the valve-opening position of the sealing valve in this manner, the performance of the abnormality determination process is not indispensable, so the valve-opening position learning process may be performed with the abnormality determination process in the aforementioned embodiment omitted.

A technical concept that can be grasped from the aforementioned embodiment and the modification examples will be described. An evaporative fuel treatment apparatus is equipped with a canister that adsorbs evaporative fuel, a vapor passage that is connected to the canister and that introduces evaporative fuel produced in a fuel tank into the canister, an outside air introduction passage that is connected to the canister and that introduces outside air into the canister, a purge passage that connects the canister and an intake passage to each other, a sealing valve that is provided in the vapor passage and that opens/closes a flow channel of the vapor passage, and a tank internal pressure sensor that detects a tank pressure as a pressure inside the fuel tank. The evaporative fuel treatment apparatus is characterized as follows. The sealing valve is equipped with a valve body that defines part of the vapor passage, a valve element that is provided inside the valve body and that opens/closes a flow channel of the valve body, a sealing member that is fixed to at least one of the valve body and the valve element and that elastically deforms while being sandwiched between the valve body and the valve element when the flow channel of the valve body is rendered in its closed state, and a step motor that moves the valve element. The evaporative fuel treatment apparatus is further equipped with a pressure sensor that is provided in at least one of the canister and a region of the vapor passage located on a canister side with respect to the sealing valve and that detects a vapor pressure as a pressure in the flow channel of the vapor passage, a pressure detection unit that detects the tank pressure based on a signal input from the tank internal pressure sensor and that detects the vapor pressure based on a signal input from the pressure sensor, a determination unit that learns a valve-opening position of the sealing valve, and a valve control unit that performs control to open or close the sealing valve. The valve control unit performs a valve opening/closing process for driving the step motor each time by a predetermined step number in changing over the sealing valve from its closed state to its open state. The determination unit learns, as the valve-opening position of the sealing valve, a position of the valve element at a time when an amount of change in the vapor pressure in performing the valve opening/closing process becomes equal to or higher than a third predetermined value set in advance.

What is claimed is:
1. An evaporative fuel treatment apparatus comprising:
a canister that adsorbs evaporative fuel;
a vapor passage that is connected to the canister and that introduces evaporative fuel produced in a fuel tank into the canister;
an outside air introduction passage that is connected to the canister and that introduces outside air into the canister;
a purge passage that connects the canister and an intake passage to each other;
a sealing valve that is provided in the vapor passage and that is configured to open or close a flow channel of the vapor passage;
a tank internal pressure sensor configured to detect a tank pressure as a pressure inside the fuel tank;
a pressure sensor that is provided in at least one of the canister and a region of the vapor passage located on a canister side with respect to the sealing valve, the pressure sensor being configured to detect a vapor pressure as a pressure in the flow channel of the vapor passage; and
an electronic control unit configured to
detect the tank pressure based on a signal input from the tank internal pressure sensor,
detect the vapor pressure based on a signal input from the pressure sensor,
determine whether or not there is an abnormality in the tank internal pressure sensor, based on the detected tank pressure and the detected vapor pressure,
perform control to open or close the sealing valve, and
determine whether or not there is an abnormality in the tank internal pressure sensor, based on a change in the vapor pressure in changing over the sealing valve from a closed state to an open state, when the electronic control unit determines that an amount of change in the tank pressure in changing over the sealing valve from the closed state to the open state is lower than a first predetermined value set in advance.

2. The evaporative fuel treatment apparatus according to claim 1, wherein the electronic control unit is configured to determine that the tank internal pressure sensor is abnormal when the amount of change in the vapor pressure in changing over the sealing valve from the closed state to the open state is equal to or higher than a second predetermined value set in advance.

3. The evaporative fuel treatment apparatus according to claim 1, wherein the electronic control unit is configured to make a valve-opening speed in changing over the sealing valve from the closed state to the open state lower when the tank pressure with the sealing valve in the closed state is higher than an atmospheric pressure than when the tank pressure with the sealing valve in the closed state is lower than the atmospheric pressure.

4. The evaporative fuel treatment apparatus according to claim 1, wherein
the sealing valve includes a valve body, a valve element, a sealing member, and a step motor,
the valve body defines part of the vapor passage,
the valve element is provided inside the valve body, and is configured to open or close a flow channel of the valve body,
the sealing member is fixed to at least one of the valve body and the valve element, and elastically deforms while being sandwiched between the valve body and the valve element when the flow channel of the valve body is in a closed state,
the step motor is configured to move the valve element,
the electronic control unit is configured to perform a valve opening or closing process for driving the step motor each time by a predetermined step number, in changing over the sealing valve from the closed state to the open state, and
the electronic control unit is configured to learn a position of the valve element at a time when an amount of change in the vapor pressure in performing the valve opening/closing process becomes equal to or higher than a third predetermined value set in advance, as a valve-opening position of the sealing valve.

5. A control method for an evaporative fuel treatment apparatus, the evaporative fuel treatment apparatus including a canister that adsorbs evaporative fuel, a vapor passage that is connected to the canister, an outside air introduction passage that is connected to the canister, a purge passage, a sealing valve that is provided in the vapor passage, a tank internal pressure sensor, a pressure sensor, and an electronic control unit, the vapor passage that introduces evaporative fuel produced in a fuel tank into the canister, the outside air introduction passage that introduces outside air into the canister, the purge passage that connects the canister and an intake passage to each other, the sealing valve being configured to open or close a flow channel of the vapor passage, the tank internal pressure sensor being configured to detect a tank pressure as a pressure inside the fuel tank, the pressure sensor being provided in at least one of the canister and a region of the vapor passage located on a canister side with respect to the sealing valve, and is the pressure sensor being configured to detect a vapor pressure as a pressure in the flow channel of the vapor passage,
the control method comprising:
detecting, by the electronic control unit, the tank pressure based on a signal input from the tank internal pressure sensor;
detecting, by the electronic control unit, the vapor pressure based on a signal input from the pressure sensor;
determining, by the electronic control unit, whether or not there is an abnormality in the tank internal pressure sensor, based on the detected tank pressure and the detected vapor pressure;
performing, by the electronic control unit, control to open or close the sealing valve; and
determining, by the electronic control unit, whether or not there is an abnormality in the tank internal pressure sensor, based on a change in the vapor pressure in changing over the sealing valve from a closed state to an open state, when the electronic control unit determines that an amount of change in the tank pressure in changing over the sealing valve from the closed state to the open state is lower than a first predetermined value set in advance.

* * * * *